UNITED STATES PATENT OFFICE.

JEAN VINCENT PROSPER LAGRANGE, OF PARIS, FRANCE.

IMPROVEMENT IN THE PROCESSES OF PURIFYING AND CLARIFYING SACCHARINE JUICES AND SIRUPS.

Specification forming part of Letters Patent No. 152,126, dated June 16, 1874; application filed January 23, 1873.

*To all whom it may concern:*

Be it known that I, JEAN VINCENT PROSPER LAGRANGE, of the city of Paris, in the Republic of France, have invented an Improved Process of Purifying and Clarifying Saccharine Juices and Sirups; and I do hereby declare the following to be a full, clear, and exact description of the same.

My invention relates to certain improvements in clarifying, refining, and defecating saccharine juices and sirups, whereby I am enabled to chemically refine said sirups, and at the same time, and by the same agent, mechanically clarify and decolorize such sirups, dispensing with the ordinary coagulating or absorbent agents, such as albumen, animal charcoal, &c.; and my invention consists in the employment of a double salt of phosphate of ammonia and baryta for this purpose.

My invention is designed for the treatment of saccharine juices and sirups after the ordinary treatment with lime and sulphuric acids, for the purpose of removing the lime compounds formed therein, and decolorizing and defecating said juices and sirups.

The double salt which I use forms, when used for this purpose, insoluble compounds of lime, which are flocculent and absorbent, and serve, in a great measure, as a substitute for the ordinary coagulating and absorbent materials, such as albumen and bone-black, used for clarifying such sirups.

In carrying out my invention, I find it most convenient to form the double phosphate of ammonia and baryta directly in the sirups under treatment, as the proportion of baryta can in this manner be most easily calculated, depending as it does upon the amount of sulphate of lime in the saccharine juice or sirup, although the compound salt may be produced ready for use, prior to the treatment of the juices, by combining the chemical constituents of the same, phosphoric acid, ammonia, and baryta, in the manner well known to chemists. Usually I mix the baryta with the sirup, proportioning the same to the amount of lime and sulphuric acids contained in the juice, then add one part of phosphoric acid and three parts of ammonia. This produces a compound salt of phosphorus, lime, and ammonia, the baryta combining with the sulphuric acid, and forming a separate insoluble compound, which settles and can be separated. The other compound resulting from the decomposition is in the form of a flaky absorbent substance, which eagerly seizes and holds the coloring matter and other impurities of the sirups, in the same manner as albumen and animal charcoal; or, rather, it acts as a coagulating and absorbent material combined.

Having described my invention, what I claim is—

The process herein described of refining and clarifying saccharine juices by the use of the double phosphate of ammonia and baryta, as and for the purposes described.

In testimony whereof I have signed my name to this specification before two subscribing witnesses.

P. LAGRANGE.

Witnesses:
   J. ARMENGAUD, Fils,
   CURELY.